Figure 1:
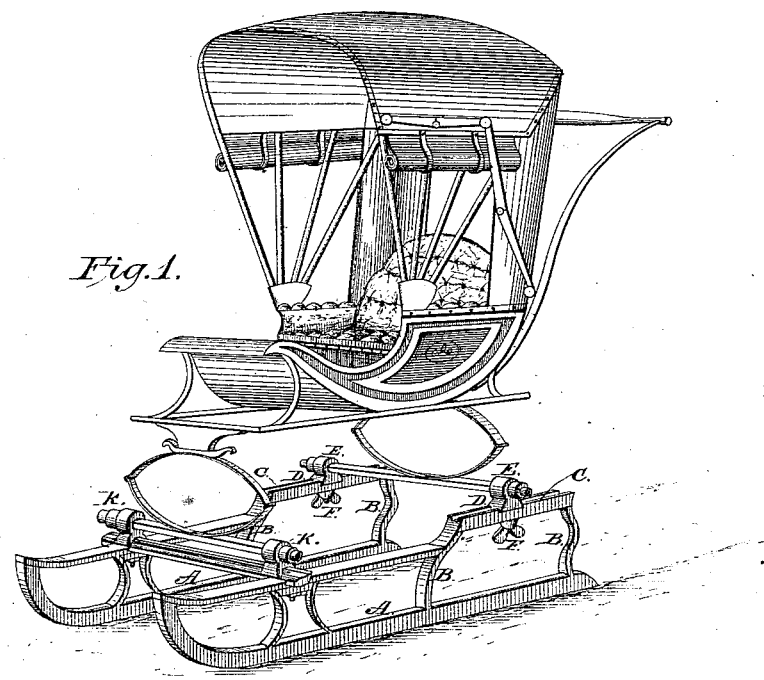
Figure 2:
Figure 3:
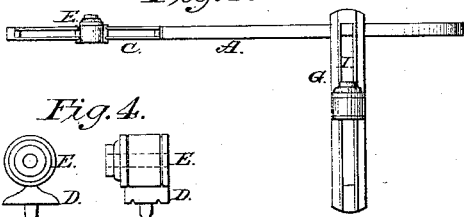
Figure 4:
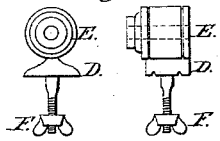
Figure 5:
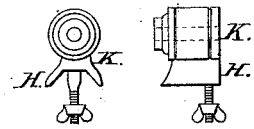

R. B. BIRD.
Sled-Runners

No. 162,266.  Patented April 20, 1875.

Attest:
C. J. Wakely
B. S. Bush

Inventor:
Robert B. Bird

UNITED STATES PATENT OFFICE.

ROBERT B. BIRD, OF MADISON, WISCONSIN.

IMPROVEMENT IN SLED-RUNNERS.

Specification forming part of Letters Patent No. 162,266, dated April 20, 1875; application filed January 21, 1875.

*To all whom it may concern:*

Be it known that I, ROBERT B. BIRD, of Madison, Dane county, Wisconsin, have invented certain Improvements in Adjustable Sled-Runners, of which the following is a specification:

My invention relates to the construction of sled-runners adapted to use with the framework and box of wagons, and arranged with an adjustability which allows of their being used with different lengths of reach and different spread of wheels, and also, as in baby-wagons, adapted to either one or two forward wheels, or to such as are constructed without forward wheels.

I construct my runners A in the usual form. A double set of knees are framed into these runners, one set in front and one set behind. The rear set B B are somewhat spread apart, and admit, in place of the usual rail, the slide C, which accommodates the shoulder D of the hub E, fitted and held in the slot or slide C with a thumb-screw, F. Between the forward set of knees is framed the transverse beam G, having the upper edges V-shaped, and slotted the whole length, in which slot I the shoulder H of the hub K slides, held in place by a thumb-screw when adjusted to either one or two forward wheels, or without a forward wheel for baby-wagons.

To use my invention I remove the wheels from the wagon, and insert the axle-trees in my hubs, adjusting to length by means of rear hub and screw, and adjusting to width between forward wheels of baby-wagons, &c., or absence of wheels, in which latter case a rod is used, as is also done where there is but one forward wheel.

The rear set of knees are longer than the front, thus raising that portion of the wagon, so as to make the frame lie evenly upon my sled.

I claim—

The combination of the sliding hubs E and K, and the slots C and I, as and for the purpose set forth.

ROBERT B. BIRD.

Witnesses:
    C. T. WAKELEY,
    B. S. BUSK.